(12) United States Patent
Stanton et al.

(10) Patent No.: US 8,136,034 B2
(45) Date of Patent: Mar. 13, 2012

(54) SYSTEM AND METHOD FOR ANALYZING AND CATEGORIZING TEXT

(76) Inventors: Aaron Stanton, Boise, ID (US);
Brandon Zehm, Meridian, ID (US);
Paul Kreiner, Meridan, ID (US)

(*) Notice: Subject to any disclaimer, the term of this patent is extended or adjusted under 35 U.S.C. 154(b) by 1110 days.

(21) Appl. No.: 11/959,215

(22) Filed: Dec. 18, 2007

(65) Prior Publication Data
US 2009/0157714 A1    Jun. 18, 2009

(51) Int. Cl.
*G06F 17/00* (2006.01)
(52) U.S. Cl. .................................... 715/255; 715/200
(58) Field of Classification Search .............. 715/200, 715/255, 206
See application file for complete search history.

(56) References Cited

U.S. PATENT DOCUMENTS

| | | | |
|---|---|---|---|
| 6,014,663 A * | 1/2000 | Rivette et al. ................ 707/690 |
| 6,094,632 A * | 7/2000 | Hattori ......................... 704/239 |
| 6,493,702 B1 | 12/2002 | Adar et al. |
| 7,142,318 B2 * | 11/2006 | Lopez et al. ................ 358/1.15 |
| 7,272,594 B1 * | 9/2007 | Lynch et al. ...................... 1/1 |
| 7,360,151 B1 * | 4/2008 | Froloff ......................... 715/255 |
| 7,490,287 B2 * | 2/2009 | Sakurai ........................ 715/200 |
| 7,506,246 B2 * | 3/2009 | Hollander et al. ........... 715/230 |
| 7,809,724 B2 * | 10/2010 | Roche et al. ................. 707/736 |
| 7,873,657 B2 * | 1/2011 | Roche et al. ................. 707/771 |
| 2002/0099730 A1 * | 7/2002 | Brown et al. ................. 707/500 |
| 2003/0028566 A1 * | 2/2003 | Nakano ........................ 707/538 |
| 2004/0006457 A1 | 1/2004 | Dehlinger et al. |
| 2004/0107102 A1 * | 6/2004 | Chung et al. ................. 704/260 |
| 2004/0205461 A1 * | 10/2004 | Kaufman et al. ............ 715/500 |
| 2004/0218838 A1 * | 11/2004 | Tojo et al. .................... 382/305 |
| 2005/0022106 A1 * | 1/2005 | Kawai et al. ................. 715/500 |
| 2005/0028098 A1 * | 2/2005 | Harrington et al. .......... 715/530 |
| 2005/0149965 A1 * | 7/2005 | Neogi ............................. 725/14 |
| 2006/0120627 A1 * | 6/2006 | Shiiyama ...................... 382/305 |
| 2006/0184566 A1 * | 8/2006 | Lo et al. ....................... 707/102 |
| 2007/0067289 A1 * | 3/2007 | Novak ............................. 707/6 |
| 2007/0218450 A1 * | 9/2007 | MacClay et al. ............ 434/353 |
| 2008/0059452 A1 * | 3/2008 | Frank ............................. 707/5 |
| 2008/0208857 A1 * | 8/2008 | Liu et al. ........................ 707/6 |
| 2008/0208864 A1 * | 8/2008 | Cucerzan et al. .............. 707/8 |
| 2009/0024963 A1 * | 1/2009 | Lindley et al. .............. 715/839 |
| 2009/0083032 A1 * | 3/2009 | Jablokov et al. ............ 704/235 |
| 2009/0110268 A1 * | 4/2009 | Dejean et al. ............... 382/159 |
| 2009/0204882 A1 * | 8/2009 | Hollander et al. ........... 715/230 |
| 2010/0268526 A1 * | 10/2010 | Bradford ......................... 704/2 |

OTHER PUBLICATIONS

Rose et al., A Similarity-Based Agent for Internet Searching, Google 1997, pp. 1-8.*
Mei et al., Automatic Labeling of Multinomial Topic Models, ACM 2007, pp. 490-499.*
Gamon et al., Pulse: Mining Customer Opinions from Free Text, Google 2005, pp. 121-132.* Ghose et al., Opinion Mining Using Econometrics: A Case Study on Reputation System, Google Jun. 2007, pp. 416-423.*
International Search Report "Notification Transmittal of the International Search Report and Written Opinion of the International Searching Authority, or the Declaration" Feb. 13, 2009.

* cited by examiner

*Primary Examiner* — Cong-Lac Huynh
(74) *Attorney, Agent, or Firm* — Buchanan Nipper

(57) ABSTRACT

A system and method are provided for analyzing elements of text for comparative purposes. Text is provided to the system in an electronic format readable by the system. The system divides the text data into scenes, which may then be compared against a range of various values across a database of scenes from different texts. Data from one text can be used to identify other texts with similar styles, or identify texts with different styles, and to rank those differences on a spectrum. The system may use data from one text to identify other texts that a user may like, and present information about the text to the user in various forms.

32 Claims, 9 Drawing Sheets

M1 = Metric 1
M2 = Metric 2
M3 = Metric 3

| Metric 1 | Metric 2 | Metric 3 | Metric 4 | Metric 5 |
|---|---|---|---|---|
| 1 | 1 | 1 | 1 | 2 |
| 1 | 1 | 1 | 1 | 3 |
| 1 | 1 | 1 | 1 | 4 |
| 1 | 1 | 1 | 1 | 5 |
| 1 | 1 | 1 | 1 | 6 |
| 1 | 1 | 1 | 1 | 7 |
| 1 | 1 | 1 | 1 | 8 |
| 1 | 1 | 1 | 1 | 9 |
| 1 | 1 | 1 | 2 | 0 |
| 1 | 1 | 1 | 2 | 1 |
| 1 | 1 | 1 | 2 | 2 |
| 1 | 1 | 1 | 2 | 3 |
| 1 | 1 | 1 | 2 | 4 |
| 1 | 1 | 1 | 2 | 5 |
| 1 | 1 | 1 | 2 | 6 |
| 1 | 1 | 1 | 2 | 7 |
| 1 | 1 | 1 | 2 | 8 |
| 1 | 1 | 1 | 2 | 9 |
| 1 | 1 | 1 | 3 | 0 | etc.

FIG. 5

SYSTEM AND METHOD FOR ANALYZING AND CATEGORIZING TEXT

BACKGROUND

Reading literature is a popular pastime for many people. Some may read epics and tragedies while others may prefer comedies. Still others may enjoy novels, short stories or creative nonfiction. Regardless of the type of literary genre, people tend to develop preferences for different writing styles and content. Logically, most people like recommendations for the next piece of literature they will read, hoping that the piece of literature will fulfill their literary desires. Unfortunately the prior art has been woefully deficient in providing accurate recommendations to people.

More often than not, a person will read a piece of literature and write, or otherwise convey, a recommendation about the book that others can read. People must then base their decision on buying or reading the book according to the reviewer's recommendation. However, the opinion of a human reviewer is subjective, and relies on the individual knowledge and preferences of the reviewer to make the system of recommendation accurate. If the user's preferences differ from the reviewers, the recommendation is not as valuable to the user. Additionally, even a single reviewer may vary their judging criteria across different books over time, making direct comparison between recommendations difficult.

The ability of a human reviewer to recommend a book is dependent on the reviewer's knowledge of other texts. This means that a reviewer who has read more books will be able to better judge a book's comparative values than a reviewer who has read fewer books. No matter how well read the human reviewer, they are incapable of consuming the entire catalog of written texts that are currently available to the reader; doing so would take several lifetimes. Even if it were possible, the ability to accurately recall and compare the contents of every book would be beyond the capability of a human reviewer.

It is also very difficult for a human reviewer to communicate a review of all the stylistic elements of a book to the user. A human reviewer may be able to write a review of a book's characters and storyline, but unless both the reviewer and the user share a common vocabulary of literary terms, it is difficult for the human reviewer to effectively describe to the user the details of the text's language.

Social networks have also provided various literature recommendation methodologies. Social networks based recommendations rely on the buying and reading habits of other people with similar preferences to the user in order to make recommendations that the user is likely to enjoy. This includes recommendation systems that recommend texts based on the buying habits of people that have purchased a book or text that the user is considering buying or reading. This also includes systems that make recommendations to users based on how well their profiles match other users that have expressed similar opinions about a given text or texts. Unfortunately, social network based recommendation systems, by definition, base their recommendations on how well the user matches the preferences of other users. As a consequence, these systems are less reliable if the user base is too small; in order to make an accurate recommendation, the user's preferences have to be matched by a sizable number of other users.

Social network based systems identify a user's preferences and use that identification to group the user with other users of similar preferences. They do not match a user to a book that matches the user's preferences, but instead to a book that has been recommended by users that have matching preferences. Consequently, these systems match users based on the characteristics which make them similar to other readers; these systems are not particularly good at matching users to texts when the user's preferences diverge from the community's preferences. As a result, the system is less able to recommend books to users who are highly unique, or to recommend books which are highly unique.

Social network based systems are not objective, and are dependent on the texts that have been read by the community. Recommendations can be influenced by advertising campaigns, the popularity of a specific book or author, the number of users in the system that have read that specific book, etc. As a consequence, social networking based systems are more capable of recommending popular books than books which are not popular, but which may still appeal to the preferences of the individual user. For example, Stephen King is more likely to be recommended by a social networking system than an unknown author who just completed his first book, because more people have read and provided input on books by Stephen King. Books with a small reader base are not treated equally by the system compared to books which have been read by a large user base, or which have an artificially inflated rating due to advertising or factors that can influence social groups.

The Flesch-Kincaid Readability Test and Lexile Scoring systems were designed to measure a text's difficulty level. The Flesch Kincaid Readability Tests are designed to determine how difficult a particular passage is to understand. There are two tests, the Flesch Reading Ease, and the Flesch Kincaid Grade Level. Although the tests use the same core measures (word length and sentence length), they have different weighting factors, so the results of the two tests do not always correlate. For example, a first text may produce a higher score on the Reading Ease test over a second text. However, the first text may produce a lower score than the second text on the Grade Level test.

The Lexile Framework provides a common, developmental scale that attempts to match reader abilities with text difficulty. Lexile aims at enabling individuals to select targeted materials that can improve reading skills and to monitor reading growth across the curriculum.

Both the Flesch Kincaid system and the Lexile Framework are designed to identify how difficult a text is to read, and do not attempt to make any predictions beyond that. For example, the Flesch Kincaid formula (fundamentally) only measures the number of words in a sentence or paragraph that contain more than a certain number of syllables. This approach is extremely simplistic compared to our approach, and is incapable of identifying higher-level stylistic elements. It is also has no structure for comparing variations within a text between scenes. The Lexile Framework does not release how their scores are measured. Moreover, the Lexile Framework targets only the difficulty level of a text, similar to Flesch Kincaid.

Methods of analyzing literature have also been used to assist writers in identifying and targeting their writing to specific stylistic trends. The only manner in which these methods have been provided use human reviewers. The writer, publisher, agent, or any interested party first identifies the commercial success of different books in different genres. That party then attempts to manually analyze each book to find stylistic trends between successful and unsuccessful books. However, this approach of using a human reviewer has proven to be slow and limited in terms of the number of books that can be analyzed. Additionally, because the review is performed by a human, the error rate is likely to be high, even if the reviewer is highly trained; accurate measurement of many stylistic elements for every scene in a book would be difficult.

Literary analysis has also been used to help agents, writers, publishers, or any interested party, identify stylistic elements in manuscripts before they have been published, and compare them to texts that are already published. The goal of such a system has been to help connect writers, agents, and publishers to each other based on the stylistic match between the writer's manuscript and the preferences of the agent or publisher. However, such methods have heretofore fallen short of their intended results. In one aspect, prior methods have relied on the author to identify an agent or publisher who is likely to want to represent or publish their manuscript, by performing a human analysis of the agent or publisher's past texts. Other methodologies have relied on the agent or publisher to manually acquire and identify a manuscript that matches their individual preferences. Neither approach provides satisfactory results.

In a system where a writer identifies a potential agent or publisher, the system relies on a time intensive process that requires a prospective writer to manually review and identify the stylistic trends of publishers or agents based upon the publishers' past texts or the texts that the agent has represented, respectively. The most common way to do this has been to first purchase a subscription to a compilation of literary publishers and agents (such as WritersMarket.com), which lists publishers and agents based on a search criteria, such as genre or whether the publisher or agent is currently accepting submissions. The writer then selects a number of publishers that publish the genre of the writer's manuscript and reviews a number of those publisher's published texts in attempt to identify stylistic similarities to their own manuscript. The writer then sends their manuscript to the publisher or agent they determine is the most likely to accept their manuscript. There are a number of limitations to such a methodology.

It is, for all practical purposes, impossible for a single person to adequately analyze all the past texts from all the prospective publishers or agents. Because of this, it is likely that the writer will not identify the publisher or agent most likely to accept their manuscript. This mismatch often results in the manuscript being rejected. If a publisher or agent rejects a writer's manuscript, the writer must resubmit it to a new publisher or agent for review. Typical time required for a publisher to review a manuscript ranges from one to two months, and current publishing standards require that the writer only submit their manuscript to a limited number of publishers or agents at a time. Accordingly, the time required to correctly target and submit a manuscript manually for publication is very long.

In a system where a publisher or agent identifies potential manuscripts, the system has relied on a writer to submit their manuscript to a publisher or agent, and then relied on human reviewers to identify texts that were worth publishing or representing. Typically, this type of system inherits all the drawbacks that have been present on the writer's side of the submission process. If a writer fails to correctly identify the publisher or agent, the ideal publisher or agent may never have an opportunity to even review the manuscript. Assuming a manuscript is received by the agent or publisher, it then has to be reviewed by human reviewers, traditionally a series of them, before it is reviewed by a person who can decide if the manuscript should or shouldn't be represented or published. This means that a manuscript has to survive an elimination process dependent on humans which may or may not have matching preferences compared to the person who ultimately decides if a manuscript should be published or represented. Additionally, such a methodology is slow, and does not allow the publisher or agent to specify the type of stylistic characteristics they want in a manuscript before a manuscript is submitted to them.

Prior text analytical systems have also been used as at least a component of e-mail spam filter tools. Such systems have compared an incoming e-mail with a statistical profile that has either been identified as "spam" or as "not spam". The systems look at the frequency of certain words and phrases, then determine if the incoming e-mail has a greater possibility of being spam or of being not spam. For example, if the an e-mail contains the text "Viagra" more times than is likely in an e-mail that is not spam as identified by the spam filter, it is likely to be considered spam.

Prior text and literature analyzing systems have not been successfully incorporated with alert systems, such as medical and stress alert systems. Studies indicate that certain health issues (such as Alzheimer's Disease) are detectable in a user's writing, such as a decrease in vocabulary use, often before they are evident to the user.

Similarly, prior literature and text analyzing systems have not been adequately used to improve search engines. Generally speaking, prior search engine systems have relied on the frequency and placement of keywords and related keywords within a website. The systems have then combined that information with other metrics, such as how many other websites of a certain topic link to that specific search result.

Literature and text analyzing systems are not typically used as tools for improving targeted ad placement. Generally speaking, targeted advertising attempts to identify the subject matter of the content of a website, and display advertisements that offer products that are relevant to the subject matter.

Prior literature and text analyzing systems and methods have not been successfully applied as tools for judging the general mood on the Internet towards a specific subject matter. Such prior methods have involved websites that gather information from many sources, such as review sites. The methods have combined this data to produce a general score for the item. For example, GameRankings.com or RottenTomatoes.com gather the 1-10 review ratings about movies and video games from different review sites, and combines them to create a single number or data point that represents the general opinion of those review sites. Another method of judging general opinion uses user polling, which allows users to vote on whether a product or item is good or bad, and the aggregate score is displayed to the user. Many prior systems require individual review sites to present their data in a form that is easy for the system to interpret. For example, providing ratings through a single score based on a 1-10 scoring system that can be easily combined with other 1-10 scoring systems. These systems have also relied on the various sites providing RSS feeds that the system can automatically interpret. However, the systems are not typically capable of identifying the general attitude of websites or content (such as blog posts) that are not explicitly formatted to be parsed by their system. Consequently, such systems do not measure the attitudes of text written on general blogs about a subject. Additionally, these sites tend to be specific to one subject matter.

Video analysis and recommendation systems have not heretofore incorporated the use of text analyzing methodologies. Previously, human reviewers and social network-only based recommendations have provided the only basis for video analysis and recommendation systems. Such systems are similar to prior book recommendation systems and, as such, inherit many of the drawbacks described herein above.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A system and method for analyzing and categorizing text is presented. In one aspect, a literary text or other "text" is first converted to a format that is readable by a computer. The system breaks the text into manageable parts, referred to as "scenes." Scenes may be defined by either: natural boundaries, where the reader could easily stop reading; or predetermined length boundaries, possibly chosen to represent elements such as paragraph length, page length, chapter length, article length, book length, series length, section length or sentence length, etc. After breaking the text into scenes, the system analyzes each scene and identifies various elements of the text. For example, it may identify basic elements of text such as the subtypes and numbers of verbs, adjectives, nouns, and other categories of text, as well as punctuation and other parts-of-speech. The system then uses that data to determine a scene's written style, identify patterns, and identify contextual and conceptual content. These elements can then be used for comparative and identifying purposes. For example:
1. Scenes with high comma use, low verb use, and high adjective use may be slower paced than scenes with low comma use, high verb use, and low adjective use.
2. Scenes with a high adverb to verb ratio and high adjective to noun ratio may be more descriptive than scenes with low adverb to verb ratio and low adjective to noun ratio.

This data can be used to identify patterns, similarities, and differences in various content. Data from one text can be compared with a database of reference texts to identify other texts with similar styles, or identify texts with different styles, and to rank those differences on a spectrum. The system then uses data from one text to identify other texts that a user may like, and presents information about the text to the readers in various forms, including but not limited to graphs and symbolic representations.

In one aspect, the system may be used to improve on human-based recommendation methods by using the formulas generated from the user's past preferences to determine which texts should be recommended in the future. While the formulas may be modified by the system over time, it consistently applies those same formulas to all books in the database simultaneously, ensuring that all results are always comparatively useful in an objective way. The system improves on human-based recommendation methodologies in many ways. For example, the system may be applied to databases of varying size, and it is able to process and compare quantities of books that are far beyond the capacity of a human reviewer.

In another aspect, the system may match a user to a book based on stylistic information without the user having to understand the different elements the system uses to make the match. The user may not even understand which elements the user does or does not like. By selecting the texts the user has already read and enjoyed, or by reading short samples and having the user select his or her favorites, the system can identify stylistic patterns and preferences that the user wouldn't be able to describe themselves. Also, the system is able to graph and display data for every book and every scene in the database in a way the user can understand for comparative purposes.

The system is provided to extract far more objective content for each scene, across all the scenes in the database, than a human reviewer. It can also retroactively modify the results of already analyzed texts to assure that all reviews made by the system are comparatively accurate to each other at the time a search is performed. The system is further provided to identity trends and track metrics that are extremely difficult for a human reviewer to identify or quantify.

In one aspect, the system may be used to improve on social network based recommendation systems by using only the preferences of the individual user and comparing them to the objective analysis of the data in the system's database. It can function based on the information provided by a single user, but still retain the ability to improve as more users utilize the system. In another aspect, the system may be used to match specific characteristics of each user to the specific characteristics of each book. A book does not have to share any characteristics with another book to be recommended, and a user does not have to share a characteristic with another user or group of users in order to match books.

The system, in another aspect, bases its recommendations on the specific characteristics of the individual user's preferences in comparison to the specific characteristics of an individual book. A popular book that has been read many times is just as likely to be recommended to a user as a book that was just freshly published and has yet to be read by another user. The system is therefore immune to social influences and marketing efforts. However, the system may be provided to incorporate user opinion and social networking to further increase the accuracy of the system's recommendations. It may, therefore, be used as a hybrid of individual data based and social network based systems.

In at least one embodiment, the system may be used to improve methods of identifying and targeting specific stylistic trends by identifying and recording stylistic data about a book without a human reviewer. The system is therefore able to analyze books limited by the speed of the software and hardware, which is much less limiting than being limited by the capabilities of a human reviewer, and is far more scalable.

In one aspect, the system dramatically shortens the time investment of prior methodologies that analyze past texts from prospective publishers or agents—potentially to the point that it virtually eliminates the previously experienced time investment—while at the same time increasing the scope and success rate of the targeting and submission process. Since the system is capable of analyzing and comparing the user's manuscript against a comprehensive database of previously published texts, it eliminates the near random process of picking and reviewing the texts of a limited number of publishers or agents. It also compares texts based on a level of details that far exceeds the ability of the normal human reviewer. Therefore, it may provide an improved system for analyzing and matching a user's manuscript to potential agents or publishers. More importantly, it does this in an extremely short time from the point that the user uploads their manuscript to the system for analysis, compared to the time it takes for previous methodologies (which is on the order of several months).

In another aspect the system improves on prior systems where publishers or agents have attempted to manually identify potential manuscripts. In at least one embodiment, the system allows the publisher or agent to specify to the system the stylistic criteria that they are interested in seeing. The system, in another aspect, may be provided to notify the user, publisher, or agent, of matching manuscripts as they appear in the system, or are uploaded by a writer for matching. The system is then capable of displaying the manuscript to the user online, bringing the writer and publisher or agent together in a manageable way, and potentially bypassing the entire traditional targeting and submitting process.

In still another embodiment, the system improves on text analyzing systems that have been used as a component to e-mail spam filter tools. In one aspect, the system may measure an additional set of metrics that can be combined with existing spam filter techniques to increase the accuracy of spam identification. By matching not only the occurrence of words and phrases, but also their role in an entire e-mail, our system is able to track stylistic inconsistencies, as well as statistically significant word and phrase occurrences.

The system, in another aspect, can be adapted for use within medical and stress alert systems to analyze the writing styles of individual users (through outgoing e-mail or text documents) over time, and watching for sudden or gradual shifts in writing styles. These shifts may be analyzed to indicate increases and decreases in stress levels, and potentially warn a user about the appearance of health symptoms. For example, if a user experiences a 20% decrease in vocabulary use over the course of a year, the system might recommend that the user consider a medical checkup. This tool could also be implemented to help an administrator monitor a workforce for sudden changes in writing style and writing behaviors, and correlate this data to indications of health or stress issues.

The system may also be provided to improve on prior search engine methodologies by tracking the amount of time that a user spends on different websites, and looking for stylistic similarities between the websites on which a user spends more time, compared to websites on which a user spends less time. In one aspect the system may assume that if a user spends more time on a site, the content of that site is more appealing to the user. It may then build a stylistic profile for each individual user based on their behavioral patterns on websites they've visited in the past, and applies that profile to predict which websites within a set is most likely to match the user's stylistic preferences. For example, if traditional keyword and link techniques identify ten websites that all discuss the same subject matter to a similar degree, the system could analyze those ten results and make sure that the first listing is the one most likely to match the user's preferences. One advantage of this is that not only does it increase the relevance of the results to the individual user, but it also makes the system difficult to manipulate by reverse engineering the formula used by the search engine (i.e. search engine optimization).

In another embodiment, the system may improve targeted ad placement by tracking the amount of time that a user spends on different websites, and looking for stylistic similarities between the websites that a user spends more time on compared to websites a user spends less time on. The system may then use the individual user profile that it created based on this information to predict the likelihood that a user will stay on a particular site for a particular amount of time. It may then use this information to determine which ads (high or low paying ads) should be displayed on a specific site for a specific user. For example, if User A is more likely to spend more time on Site A than Site B, the system may display higher paying ads on Site A for User A than it would on Site B for User A. At the same time, the same system might determine that User B will spend more time on Site B than Site A, and so the system may display higher paying ads on Site B for User B than for Site A for User B.

In one aspect, the system may be used to specifically identify both the emotional quality of a website and the target of the emotional quality. For example, if the content is a review about a specific product (for example a cellular phone provider), the system will attempt to identify whether the review is positive or negative, and whether or not the positive or negative opinions are directed towards the cellular provider. Based on the results, it could determine if it should display advertising for the cellular provider's services, or for a competitor's services.

In another aspect, the system may be used as a tool for judging the general mood on the Internet towards a specific subject matter. As such, the system may identify the emotional content in written speech that is not specifically designed for computer interpretation. Consequently, the system does not rely on RSS feeds, and can be applied to any subject matter that is identifiable by the system. The system also bypasses some of the shortcomings of User Polling, which tends to break if there is not a large enough user base for the score to be accurate, and tends to be biased depending on the user base of the specific site the polling is conducted on. By being designed to be applied to many websites, the system does not rely on any single user base, and is not subject to the bias of an individual site.

In still another aspect, the system may be used in combination with tracking and fingerprinting systems for tracking stylistic characteristics in content on the Internet. In one embodiment, the system is applied as a method of tracking specific styles of writing on any large database, including a database of Internet, forum, and blog posts. The system can be used to identify and track the appearance of a specific writing style profile as it appears on the Internet—i.e. notifying the user whenever a forum post is made that matches the writing style of a specific person or group of people.

In another aspect, the system also improves on video analysis and recommendation systems. In this manner, the approach is similar to that described with respect to the book recommendation system. One difference, however, is that the technology is being applied to a video medium, rather than a purely written text.

Thus, there are additional aspects of one or more embodiments. They will become apparent as this specification proceeds.

BRIEF DESCRIPTION OF THE DRAWINGS

Non-limiting and non-exhaustive embodiments of the present system and method are described with reference to the following figures, wherein like reference numerals refer to like parts throughout the various views unless Otherwise specified.

FIG. 5 is a graphic comparative example one manner in which multiple metrics may be used within the system for matching user preferences with one or more texts;

DETAILED DESCRIPTION

Figure 1:
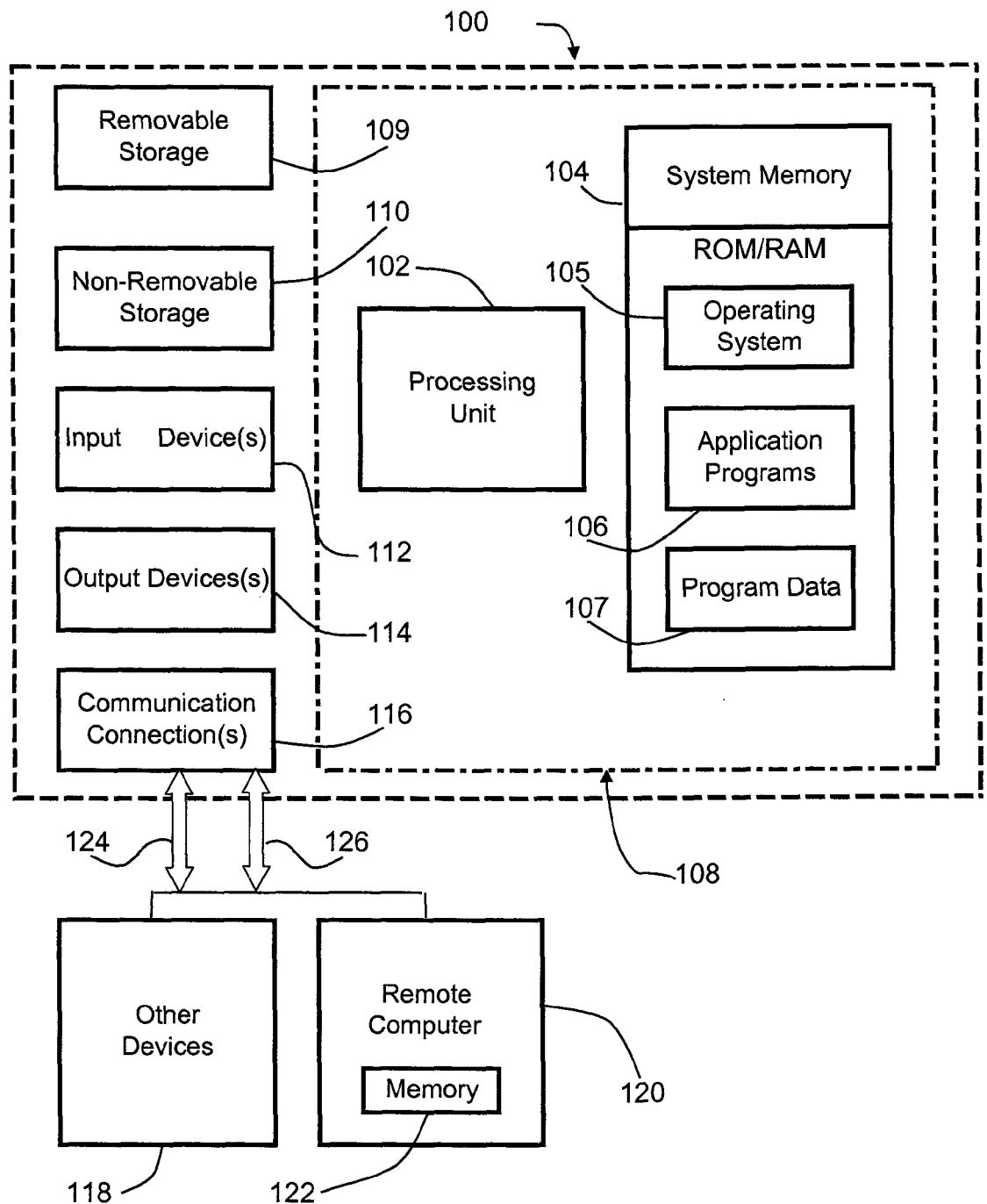
FIG. 1 is a functional block diagram of a computing system adapted to implement an embodiment of the present system and method.

Embodiments are described more fully below with reference to the accompanying figures, which form a part hereof and show, by way of illustration, specific exemplary embodiments. These embodiments are disclosed in sufficient detail to enable those skilled in the art to practice the system and method. However, embodiments may be implemented in many different forms and should not be construed as being limited to the embodiments set forth herein. The following detailed description is, therefore, not to be taken in a limiting sense.

"Literary text" or "text", as those terms may be used herein, refer generally to the words, letters, numbers, punctuation, and symbols that comprise a reference, which may be provided in any print form (such as books, magazines, newspapers, manuscripts, and the like), electronic form (such as files and data generated by or with the assistance of one or more computer devices); words and symbols generated on a video reference; and transcriptions of live audio, recorded audio files or audio tracks to videos (either manually generated or through electronic means that include voice recognition software, electronic transcription services, and the like).

"Scenes", as the term is used herein, may be defined by either: natural boundaries within the text, where the reader could easily stop reading; or predetermined length boundaries, possibly chosen to represent elements such as paragraph length, page length, chapter length, article length, book length, series length, section length or sentence length, etc. A natural boundary can include chapter breaks, line breaks, vertical and horizontal spaces, identifying characters, subheading breaks, the beginning and ending of a text, separations between texts in a series, and review sections (essentially, any section break). The content, between any consecutive two of these boundaries will hereafter be referred to as "scenes." Scene length is measured in the number of words in the scene, or the number of characters in the scene (for example, total number of Unicode characters). In the case of analyzing other types of media besides text, scene length can be defined by other metrics, such as length in number of seconds or occurrence of extended dead space where no content is delivered.

"Bookmark", as that term is used herein, fundamentally refers to any type of data, score, metric, or characteristic (individually or in combination) that can be used to match or distinguish one text from another. In one aspect, the system may measure the basic elements of a text and use the data to assign ratings that are representative of different elements of the text. These representations are to be understood as, "Bookmarks." Generally, the purpose of Bookmarks is to combine and process specific data points from scenes that are relevant to the characteristics that each individual Bookmark is attempting to measure. For example, a "Description" Bookmark may look at the frequency and ratio of adjectives and nouns, or adverbs and verbs, to determine how many descriptive elements a text has. It may then use this data to assign a scene an appropriate "Description" value.

The following are various, non-limiting examples of some Bookmarks that may be used by the system. While these examples use specific parts-of-speech, such as nouns and verbs, to illustrate example implementations of each bookmark, they can also or alternatively use any part-of-speech element or metric within a text, including any category of the following: adjectives, adverbs, nouns, punctuation, verbs, prepositions, conjunctions, interjections, modifiers, predeterminers, pronouns, particles, or symbols. Additionally, bookmarks can use metrics based on the comparisons of these elements, such as the adjective to noun ratio, comma to sentence length ratio, or the ratio of the number of verbs to the length of the scene. Other possible data points can be derived from specific conditions for these metrics, such as measuring only verbs classified as action verbs, or verbs that appear only outside of spoken content. It also includes any category of the following: paragraph length, amount of content within dialog (between quotation marks), amount of content outside of dialog, word length, commas and other punctuation per sentence, total text length, commas and other punctuation used outside of dialog syntax, number of paragraphs, sentence length, ratio of commas to sentence length, unique words, vocabulary, non-English words, or words containing unusual characters.

Perspective refers to the point of view in which a text is written, such as first person, second person, or third person perspective. Perspective can be estimated by counting the number of first person indicators in sentences that contain dialog. A first person indicator can mean the appearance of a capital letter I preceded by a specific use of punctuation, such as commas and quotation marks, that indicate the I is being used outside of quotation marks (i.e. not being spoken by a character). The ratio between lines of dialog that contain first person indicators and the total lines of dialog can be used to indicate a text's perspective.

Pacing refers to how text is physically laid out on a medium, such as a page. It refers to how quickly your eyes move down a medium as you read. For example, a page with many short paragraphs and lots of dialog exchange between two characters would have high pacing, since the reader's eyes move down the page quickly with very few words used. Inversely, a scene with only a few, lengthy paragraphs and little dialog could be considered low pacing. Pacing can also be influenced by many elements, including but not limited to punctuation, sentence length, paragraph length, dialog levels, and scene length.

Density refers to the difficulty of the actual material. If can be influenced by many elements, including but not limited to word length, vocabulary, sentence length, and punctuation.

Dialog refers to the amount of text within a scene that is spoken by a character. This can be determined by tracking the number of words or characters that fall within or between opening and closing quotation marks.

Description refers to the use of descriptive elements in the scene, such as adjectives and adverbs, which modify nouns and verbs, respectively. Description can be determined by tracking the ratio of adverbs to verbs and adjectives to nouns. This way, the system can identify the likelihood that a given author will modify a noun or verb with a descriptive adjective or adverb, i.e. "He quickly walked to the purple door and angrily pulled it open," vs. "He walked to the door and pulled it open." Description levels can be influenced by many factors, including but not limited to adjective usage, adverb usage, vocabulary, noun usage, and verb usage.

Action refers to the amount of physical movement that occurs in a scene, and is influenced by the ratio of elements such as action verbs to total word count. It can be influenced by many factors, including but not limited to verb usage, adjective usage, adverb usage, noun usage, verbs that appear outside of spoken text, and vocabulary.

Rating is determined by analyzing user feedback—either data explicitly given (such as a user voting for a text) or data learned (such as analyzing the data generated by a user during interactions with the system)—to determine user attitude towards a certain text. This may include, but is not limited to, allowing users to rate texts based on their assessment of how well they like the text (such as on a rating scale of 1 through 5). It also includes data derived from information about which texts a user does or does not place in a favorites category, or which texts a user elects to use (or not use) as a basis for additional searches to find matching texts. As an example, a text may be considered to have a high rating if it is commonly chosen by users as a basis for finding other similar texts. This data can be used as an additional bookmark to help objectively identify and measure elements of a text that are difficult to measure through computer analysis alone.

Addiction level determines the boundaries between punishment and reward for some or all of a user's bookmarks (as described herein below). The system analyzes each text to identify the order, duration, position, and frequency of scenes that are punishment compared to the scenes that are reward. It then compares this information to behavioral research that focuses on, among other things, the optimal timing and pattern of delivery of reward and punishment in classical and operant conditioning to increase the likelihood of a conditioned behavior. In this case, conditioned behavior is continuing to interact with the text, such as continuing to read a book, or continuing to read a website. Based on this analysis, the system 10 assigns the text an Addiction Bookmark value intended to predict the likelihood that an individual reader will successfully complete a text once they've started reading it.

Interest Level refers to a method used to identify a text's subject matters and predict the level of a user's interest in those subject matters. It does this in two ways. First, the system may use a Word and Phrase Significance measure, wherein individual words and phrases (combinations of words) within each scene are assigned a value intended to represent how interested a user is in that particular word or phrase. For example, the word "gun" may have a high value rating compared to the word "sand", depending on the user. The system 10 may be provided with the ability to include or exclude specific words or categories of words from the measurement, such as measuring verbs, nouns, and adjectives, but ignoring other common word usage, such as, "he, she, it, the, or, in," and so forth. The individual values of the words are then combined to produce an overall interest value for the scene. The values of each word are determined differently depending on the amount of information the system has about the user. Alternately, if the system 10 has a limited amount of information about the user, it uses a default value for each word. One way of determining the default interest value of a word is by basing the value on the frequency that the word is searched for on the Internet through search engines, often referred to as a keyword rank. Basing the default interest value of a word on keyword rank allows the system 10 to attempt to make an objective prediction of the average user's attitudes towards a certain word or subject matter. Alternatively, the default value can be determined by an assessment by the development team or the system's user base (user feedback), or some combination of all the above methods.

If the system 10 is provided with an adequate amount of information about the user, it may attempt to create a user-specific set of interest values to use as the basis for analyzing a scene's content. It does this by measuring the frequency and occurrence patterns of individual words and combinations of words in texts that the user has consumed. Words and phrases that are encountered more frequently than is statistically likely, or are determined unique or of comparatively more importance by a similar measure, are assigned a greater value. Words and phrases that are encountered less frequently than is statistically likely, or are determined to be uniquely absent or of comparatively less importance, are reduced in value. The idea is that related words and phrases will be used more commonly in texts with similar content. As an example, a book that takes place on the sea is likely to use related words such as sea, sand, water, beach, ship, boat, swimming, and other words or phrases that are associated with the sea. If a user consistently adds texts to their channels that are either about or set near the sea, these words consistently gain in significance as they occur repeatedly across texts and channels. Commonly reoccurring words that share a similar theme can optionally be grouped and labeled into categories based on the frequency and pattern of their appearance. In the above example, the category may be "Books based near the sea". In this way, the system is able to use the data to make recommendations to a user based on either A.) its prediction about the likelihood that the user will find the text's content interesting, and/or B.) the user selecting a specific content matter, i.e. The user requests to see texts that take place near the sea.

Statistically Improbable Phrases is another manner in which the system 10 may identify a text's subject matters and attempt to predict the level of a user's interest in those subject matters. Statistically Improbable Phrases are phrases which occur frequently in a given text, but do not appear with any significant frequency in other texts. By identifying these phrases, the system is able to identify content which is generally unique to a given text. Since it is statistically improbable that these phrases will appear in texts that do not contain similar subject matters to each other and are not common in other texts, they therefore provide a good indicator as to the topic of a current text. This approach is the most effective for identifying character names and common themes in texts, as well as the subject matter of non-fiction texts.

Learning Curve refers to a method used to evaluate the amount of new elements that are introduced to a user in a scene for the first time within a single text or a series of texts.

In one aspect, the Learning Curve may be applied to vocabulary. The system 10 may be provided to count the number of times from the beginning of a scene that a unique word appears. The system 10 counts the unique word as having appeared after encountering it a certain number of times (such as the first, second, or third time) within the same scene or text. A word may be considered "encountered" if the system 10 identifies an exact spelling of the word, or if the system 10 determines that two different spellings are actually the same word. The number of times a unique word has to be encountered before it counts as having appeared in a scene or text can be adjusted for different levels of sensitivity. After a unique word has appeared, it will not be counted as a new unique word by the system 10 no matter how many times it occurs in subsequent scenes. For example, if the first scene of a text uses the word "catapult" and the second scene of the same text also uses the word "catapult", the first occurrence could be counted as the first time that particular unique word appeared in the text, and subsequent occurrences would not be counted or displayed as unique. Each scene is then assigned a value that represents the number of unique first occurrences that appear within that scene. The most common result of this approach is that the first scene of a text will have a very high value as the system identifies even common words as unique first appearances (i.e. it, the, they, he, you, me, etc.). Subsequent scenes will have lower quantities of first occurrences. This data can be used to determine at any given point in a text the quantity of unique vocabulary words that remain to be introduced from that point forward until the conclusion of the text. One example of this would be to identify for users the point in a text when the user will have encountered the majority of the vocabulary words they are expected to encounter while consuming the text, or at what point a reader is no longer required to know or learn additional vocabulary content before completing a book or series of books).

In another aspect, the Learning Curve may be applied to proper nouns. The system may be provided to apply the same method used regarding vocabulary, but count the occurrences and appearances of new proper nouns instead of new unique words. In this way, the system 10 identifies where in a text a character name or place name first appears, and the frequency that a text introduces new places, characters, or items with names.

Figure 3:
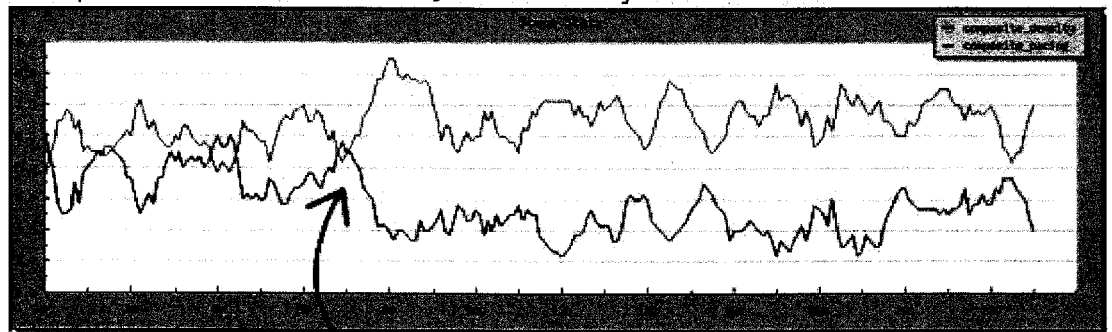
FIG. 3 is a graphic example of shift point data from a particular text.

Don't Give Up Until . . . refers to a method whereby the system attempts to identify shifting points in a text. A shifting point is a point in a text where there is a significant difference between the scenes that come before the shifting point and the scenes that follow it. The system 10 identifies a shift point in a text whenever there is a significant change in the trends of a Bookmark value or a combination of Bookmark values across the text. As an example, say there are five sequential scenes with an average density Bookmark value of "8", and are followed by five additional sequential scenes with an average density Bookmark value of "3." The division between the first and the second set of scenes would be considered to be a shifting point. FIG. 3 depicts an example of shift point data from Jurassic Park, by Michael Crichton.

Many of the process examples presented herein are described using mostly the Pacing, Density, Dialog, Description, and Action bookmarks. Limiting the examples to include these specific bookmarks is for convenience only; most of the systems described in this patent can be applied using any number of bookmarks, greater or less than the number used in the examples, and in various combinations.

FIG. 1 illustrates an example of a suitable computing system environment in the form of a computing device 100 on which an electronic form of the system 10 may be implemented. The computing device 100 is only one example of a suitable computing environment and is not intended to suggest any limitation as to the scope of use or functionality of the present system. Neither should the computing device 100 be interpreted as having any dependency or requirement relating to any one or combination of components illustrated in the exemplary operating environment. The system is operational with numerous other general purpose or special purpose computing system environments or configurations. Examples of well known computing systems, environments, and/or configurations that may be utilized include, but are not limited to, personal computers, server computers, network PCs, mini-computers, mainframe computers, distributed computing environments that include any of the above systems or devices, and the like.

The system may be described in the general context of computer-executable instructions, such as program modules, being executed by a computer. Generally, program modules include routines, programs, objects, components, data structures, etc. that perform particular tasks or implement particular abstract data types. The system may also be practiced in distributed computing environments where tasks are performed by remote processing devices that are linked through a communications network. In a distributed computing environment, program modules may be located in both local and remote computer storage media including memory storage devices.

Referring to FIG. 1, an exemplary system includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes operating system 105, one or more application programs 106, and may include program data 107. Examples of application programs 106 include phone dialer programs, e-mail programs, scheduling programs, PIM (personal information management) programs, word processing programs, spreadsheet programs, Internet browser programs, and so forth. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as a keyboard, mouse, pen, voice input device, touch input device, scanner, etc. Where the output device 112 is a scanner, it is contemplated that the scanner may be of any suitable type, such as drum, flatbed, handheld, and the like. Output device(s) 114 such as a display, speakers, printer, etc. may also be included. All these devices are known in the art and need not be discussed at length here.

Computing device 100 may also contain communication connection(s) 116 that allow the device to communicate with other devices 118 (including printing devices, stand alone e-mail servers, facsimile devices, and the like), such as over a network or a wireless mesh network. Communication connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
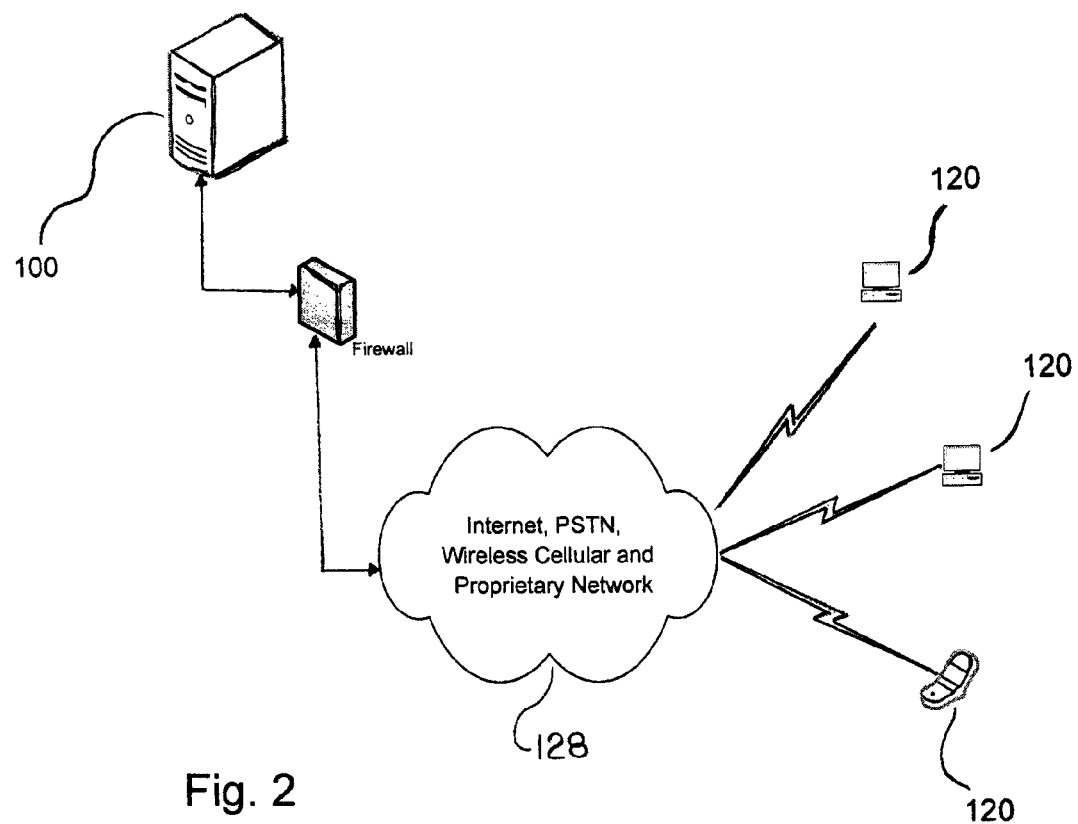
FIG. 2 is a system schematic of one contemplated embodiment of the system and method of analyzing and categorizing text.

The computing device 100 may operate in a networked environment using logical connections to one or more remote computers, such as a remote computer 120. The remote computer 120 may be operated by a client, consumer or third-party service provider (including one or more providers of various information databases, research tools, reporting services, and the like); may take the form of a personal computer, a server, a router, a network PC, PDA, a peer device, or other common network node; and typically includes many or all of the elements described above relative to the computing device 100. It is further contemplated, however, that the remote computer 120 could be provided in the form of a telephone, which includes cellular telephones, landline telephones and the like. The logical connections depicted in FIG. 1 include a local area network (LAN) 124 and a wide area network (WAN) 126, but may also include other proprietary and non-proprietary networks 128, such as wireless networks, a PSTN, the Internet, an intranet, and the like. It will be appreciated, however, that the network connections shown are exemplary and other networking and communications means may be used. FIG. 2 illustrates an example of a suitable system environment on which the present invention may be implemented.

Text to be analyzed by the system 10 should be converted from the format in which it is first provided to a format that is readable by the computing device 100 ("text data"). In one embodiment, an input device 112 in the form of a scanner may be used to convert the text from its print format to a digital image or collection of computer readable data, which may be temporarily or permanently stored on the computer storage media associated with the computing device 100. Where the text is provided to the system 10 in an electronic format, such as files and data generated by or with the assistance of computer devices, one or more application programs 106 may he provided, when necessary, to convert the electronic text into the text data readable by the computing device 100. It is contemplated that the text may be provided as words, numbers, letters, punctuation and symbols generated on a video reference, such as a video file stored on one of various computer storage media. As such, the media may be readable by the computing device 100, such that the text (subtitles for example) may be retrieved by the computing device 100 as a separate data file. Otherwise, manual and electronic transcriptions may be made of the text to convert it into the text data that is readable by the computing device 100. Similarly, the text may be provided in the form of transcriptions of live audio, recorded audio files or audio tracks to videos. Each of these may be either manually generated or provided through one of many electronic means known in the industry that include voice recognition software, electronic transcription services, and the like. Any of these elements of software may be directly associated with the computing device 100 as one or more application programs 106 or simply provided by an external source.

In one particular aspect, the application programs 106 may be provided to receive the text data and break it into manageable parts or "scenes." After breaking the text data into scenes, the application programs 106 analyze the scenes and identify one or more various Bookmark elements of the text. In one aspect the application programs 106 may identify one or more basic elements of text, such as the subtypes and numbers of verbs, adjectives, nouns, and other categories of text, as well as punctuation and other speech elements, generating analytical data. The application programs 106 may then be provided to uses the analytical data to determine one or more scenes' written style(s), identifying patterns and contextual and conceptual content, in order to derive the "scene data" for the subject text. These elements can then be used for comparative and identifying purposes.

After all the scene data from a text is collected, the data from each scene is compared against the range of values across the entire database of scenes, from all reference texts in a database relative to one or more previously analyzed texts. Each Bookmark value of each scene is placed on the spectrum relative to the other Bookmark values of the other scenes in the database. The scene with the lowest value defines the bottom of the spectrum, and the scene with the highest value defines the top of the spectrum. The spectrum may then be divided into any number of subcategories intended to group scenes with similar characteristics (for example, values within a similar range). The number of subcategories can be increased or decreased to achieve the desired sensitivity of the system and to accommodate for the size of the text database being analyzed; ten subcategories is less sensitive than one hundred, one thousand, or ten million subcategories, for example. As an additional example, the system may be configured with subcategories labeled one through ten. A scene with a Description value of three means that it has a comparable Description value to other scenes also categorized as three, a greater Description value than scenes two or below, and a lesser Description value than scenes four or above.

While the most obvious way to match two metrics is a direct one-to-one comparison (i.e. all scenes rated as "3" match other scenes rated as a "3"), the system sensitivity is adjusted to allow a range of responses to be identified as a match depending on how important the element is to the specific user's preference. For example, when matching a metric of 3, the system will match other metrics with 3, plus or minus a range determined by either a system default setting, user input, or by the self-learning system described later in this patent. The ability to adjust the match sensitivity level by widening or narrowing the scope of what is considered by the system to be a positive match can be applied at any point that metrics are compared. This will be referred to herein as adjusting "sensitivity."

After each scene in a text has been analyzed and assigned values for each tracked Bookmark, the system can match the text against other texts with similar characteristics. Direct scene-to-scene matching can be done by comparing the values of one scene against the values of another scene to determine how well two scenes match one another on a single or multiple Bookmarks. However, there is another step that should be taken before the system is ready to match a multi-scene text to another multi-scene text, since both multi-scene texts contain numerous individual data points for each Bookmark (at least one for each scene).

A Cumulative Bookmark, in this context, refers to a value that has been assigned to a text as a whole and represents that text's overall value for that Bookmark. The Cumulative Bookmark for a text is based on analyzing the data of the individual scenes that appear within the text, data from the total text, and data from the total database of texts.

The system 10 may use a variety of data points and metrics to determine the value of a Cumulative Bookmark. For example, the data points may include the frequency of a scene score throughout the text, such as the most commonly occurring score, second most commonly occurring score, and the like. In another aspect, the relationships between scene scores may be used, including any metrics based on a relationship identified through the comparison of bookmarks. Another aspect may use the placement and order of the scene scores throughout a text, such as the order that scenes appear in relation to each other. An example would be using the frequency that a highly rated scene is followed by a lowly rated one to determine how similar one text is to another. The statistical mode, mean, and median of scores across the text may also be used as the data points. In another aspect, the data points may include the quantity and patterns of common and uncommon elements, as compared to the entire database. For example, the frequency of occurrences, within a text, of a characteristic that is considered to be uncommon when compared to other texts in the database. Moreover, the data points may include any of the possible metrics applied in such a way that they emphasize scenes that may hold greater importance in predicting and judging a user's preference for a text, specifically, the opening scenes, climax scenes, and closing scenes of a text. As an example, this would include weighting the scores of the first several scenes of a text more heavily than scenes that follow on the assumption that they are the most important to a user's first impression of the text. These are but examples, provided for descriptive purposes and may include other data points as well as various combinations of different data points.

There are several contemplated approaches to matching multi-scene texts using cumulative bookmarks. For example, a cascade matching methodology may be used, wherein the system orders the Bookmarks hierarchically in order of importance to the reader's preference. For example, if Pacing is considered more important than Density in determining if a reader will like the text, the order of the Bookmarks may look like this: Pacing, Density, Description, Dialog, Action. If Action is considered the most important, the order may be different, with Action listed first, such as: Action, Pacing, Density, Description, Dialog.

In a cascading match, the system 10 uses Bookmark data from a user-selected or user-created source to find other texts with similar Bookmark characteristics. This means that either A) a user may select a text, and the system 10 will use the values of that selected text to populate the Bookmark and data values used to match other texts, or B) the user may manually enter the values for each Bookmark, including sensitivity, hierarchical order, and individual matching values, to determine what is or is not a successful match. The system 10 then searches in the hierarchical order described in the passage above. Using the example order of Pacing, Density, Description, Dialog, and Action as examples: First, the system 10 may find other texts that match the base text's Pacing value, and remove any non-matching text from the list of potential matches. From the texts that remain on the potential matches list, the system 10 may find books that have a matching Density level, and again remove any non-matching texts from the list of potential matches. The system 10 may then continue this pattern until it reaches a specified criteria. That criteria may include, but is not limited to, narrowing the possible matches to a certain quantity or quality of results, successfully matching against all specified Bookmarks, or matching against all bookmarks specified by the system or the user. The results may then be provided to the user.

In another aspect, an intersecting match may be used, wherein the system 10 uses Bookmark data from a user-selected or user-created source to find other texts, based on an intersection of specific bookmarks instead of a cascading hierarchy of bookmarks that eliminates results based on the order of the evaluated metrics. In such an instance a user may select a text, and the system 10 will use the values of that selected text to populate the bookmark and data values used to match other texts. Alternately, the user may manually enter the values for each bookmark, including sensitivity and individual matching values, to determine what is or is not a successful match. The system 10 then identifies other texts in the database that match all required bookmarks regardless of the order. If the current search requires a text to match on five different Bookmarks with a sensitivity of zero, it returns texts that match each and all of those Bookmarks regardless of bookmark order. In other words, it returns matches that are present at an intersection between those characteristics. The system 10 may then return the results to the user, filtered by certain criteria. That criteria may include, but is not limited to, limiting the number of possible matches to a certain quantity or quality of results, and reordering the results based on additional criteria, such as average user rating.

The system 10 may also be provided to operate with a varying quality and quantity of information about the preferences of the user. If the system 10 has a limited amount of information about the user, it may use matching and searching techniques that can operate on the information that it has. However, in one embodiment, the system 10 is provided to improve its accuracy and techniques as it gains more information about the user. One way to gather user data is through user accounts. Accordingly, one embodiment of the system 10 provides for the creation of a user account, which stores information about the user's behaviors, actions, and preferences. This can include but is not limited to data about the user's Internet browsing and surfing behaviors, demographic background, and a history of their interactions with the system. This information can be collected from a single visit, or accumulated and built upon over multiple visits. Specifically, the user account allows a user to specify certain information that can be used to increase the accuracy of the system 10.

In one aspect, a user may be able to store information in a "user channel". A user channel allows the user to group texts that they perceive as having similar characteristics, such as placing all of their favorite science fiction novels into a single channel. These user channels can be used to group any material based on any criteria or characteristic, including but not limited to genre, user attitude (like or dislike), style, etc. The data in these channels can be analyzed by the system 10 to improve its accuracy both in general and for that specific user.

User accounts and user channels also allow users to save their preferences and customized information for later retrieval, such as saving their manually created search values, search order, and formulas. User accounts also allow users to share specific information with other users on the system 10. This may include, but is not limited to, sharing formulas, search values, search orders, lists of favorite or disliked texts, user channels, and any other information the system allows, such as graphs and information generated by the system through analysis of the texts by the system.

In another aspect, the system 10 may use one or more matching techniques that do not use cumulative Bookmarks alone. For example, user threshold analysis may be used, which is more sophisticated and tailored to the preferences of the individual user than Cascading or Intersect matching. The system 10 may use the self-learning techniques described herein below to identify a user's preferred Bookmark threshold. A preferred bookmark threshold is defined as a value range inside of a Bookmark or metric that the system determines represents a user's preferred value. For example, if the system 10 determines that a user likes texts with a Density Bookmark rating that falls between 5 and 8 on a scale of 1 through 10, the range of 5, 6, 7, and 8 would be considered that user's Density Threshold. Texts with a density rating that falls within that threshold are considered more appealing to the user than texts that fall above or below that threshold, and are termed "rewards" herein. Texts with a density rating that falls outside of that threshold are considered less appealing to the user than texts that fall within that threshold, and are termed "punishments" herein. A user's threshold for each bookmark and metric can be determined dynamically by the system based on data about each user, including but not limited to data given by the user, as well as data learned, such as data generated by monitoring a user's interaction with the system.

Once the system 10 successfully determines a user's Bookmark thresholds, each text in the database is analyzed to determine which portions of the text fall inside and outside the user's thresholds. This data can be used to rank a text on a spectrum compared to the other texts in the database. The data that can be used to do this includes, but is not limited to one or more of the following metrics: quantity of the text that falls inside a user's threshold; quantity of the text that falls outside a user's threshold; and the relationship between scenes in a text in regards to being within or outside the threshold. This includes but is not limited to looking at the order, patterns, and duration of scenes in and out of a threshold. As an example, this can refer to the duration that a text remains in a punishment threshold before returning to a reward threshold. In other words, a text may have a high level of reward at its beginning or end, but a significant extended portion of punishment in the middle. This information can be used to make a prediction about a user's attitude towards the text.

The results of this analysis are used by the system to calculate a text's match against the user's preference. In one aspect, this may be done using the data to assign a Cumulative Bookmark rating to the text for use in a hierarchical matching system similar to the one described under "Cascading Match." Alternately, the system 10 may use the data to match texts with similar characteristics directly. The system 10 returns the results to the user, filtered by certain criteria. Those criteria may include, but are not limited to, limiting the number of possible matches to a certain quantity or quality of results, and reordering the results based on additional criteria, such as average user rating.

Using the Cascading Match system, the order that the bookmarks are searched through impacts the final results returned to the user. The system 10 may determine the ideal order of a hierarchical search in three ways: a default order; a user generated order; and a system-generated order (self-learning). A default order is an order that's used by the system 10 when it does not have enough data to use one of the other two, meaning a user has not specified an order, or the user has not provided enough information for the system 10 to generate an order for them automatically. In this case, the system 10 uses a previously determined default order intended to provide results that match the user's preference.

If the system 10 determines that the user provided enough data to create a custom order, one of the other two methods are used. In one aspect, a user specified order may be used, which is determined by the user before the search is started. This means that the user indicates to the system what order they want the search performed in. As an example, a user may choose to have the Pacing bookmark matched first, followed by Density, etc. As an alternative, the system 10 may use a self learning order, as described in detail herein below.

After the system 10 has gathered an adequate amount of information about the user, it may use that information to customize the matching system to that user. In this way, the system is self learning over time. Below is an example to help illustrate at least one manner in which such a learning system could function. This example outlines one embodiment of a methodology used by the system 10 to determine a Bookmark search order specific to the user's input. First, a user creates a channel, selects texts from the database that they believe share similar characteristics to each other, and includes those texts in the channel. For the purpose of this example, this would mean that a user may create a channel for their favorite science fiction books. The system 10 may then analyze the data from the texts included in that channel. Specifically, the system 10 looks for information regarding variations in the data between texts. This can include any metric or combination of metrics or Bookmarks, including individual scene metrics. Continuing the above example, the system 10 looks at each book in the channel and determines each bookmark's cumulative score. For example, it may identify each book's Pacing, Density, Action, Dialog, and Description scores. It then calculates the standard deviation of each set of bookmark scores, and rearranges the order of the bookmarks depending on the size of the standard deviation. This could include, but is not limited to, ordering the importance of the bookmarks by the ascending order of the bookmarks' standard deviations. As an example, if Pacing has a standard deviation of "2", Density has a standard deviation of "3", and Action had a standard deviation of "5", the order would be rearranged as so: Pacing, Density, Action. The reasoning behind this is that if one metric or bookmark has greater variance than another, this indicates that the user has a greater tolerance for that specific metric than the others. For example, if all ten books in a "favorite books" channel have an exact value of "5" for Action, but the Density range across all the books falls between: "3" and "9", the system assumes that the user is more sensitive to variations in Action levels than in Density levels, and adjusts the formulas to be more exact when matching Action levels than Density levels. This method can be applied to metrics at any point in the system, from the basic metrics, such as the number of verbs in a scene, to the higher order metrics like cumulative bookmarks. This learning system can be applied on a channel by channel basis, allowing users to get different results based on the identifying characteristics by which the user chooses to group texts. This system of self learning can be applied to other areas of the system 10 beyond determining the search order of Bookmarks. It is described here as a way to determine the order of a hierarchical search as a reasonable example of its implementation.

In order to develop the most accurate default formulas for each Bookmark (the formulas used by the system 10 when there is not enough information to create a custom formula for the user), the self learning system may be applied to the basic metrics in a controlled context. For example, for the Action Bookmark the system 10 first identifies scenes that are high and low action scenes, comparatively. The system 10 may identify high action vs. low action scenes through a combination of user feedback and manual analysis of each scene. All the scenes may then be compared to detect variations in specific metrics between high action and low action scenes. For example, if the average word length does not change much between scenes that are considered high action and scenes that are considered low action, then the average word length does not significantly impact a user's perspective of a scene's action level. However, if there are significant variations in the ratio of verbs to total scene length between high and low action scenes, verb ratio does impact a user's perspective of a scene's action level. The system may then determine which of the tracked elements play the most significant roles in identifying characteristics that the system is interested in tracking, and use that data to assemble the default formulas.

In at least one embodiment, the system 10 may be provided to offer a feature ("Press My Limits" feature) that is designed to offer users a recommendation of texts that are different from their traditional preference, making it easy for users to expand their horizons by making recommendations which are slightly outside of their comfort zone. The feature attempts to identify the texts in the database that are most likely to be enjoyed by the user, but at the same time fall to some degree outside the user's range of traditional preferences. The Press My Limits feature may be provided to be adjustable to allow the user to increase or decrease the distance that the values of the recommended texts fall from the user preferred values. In the following example, increasing the Press My Limits setting means the user is requesting texts that are more different from their user preferred values, and decreasing the Press My Limits settings means that the user is requesting results that are less different from their user preferred values.

Figure 4:
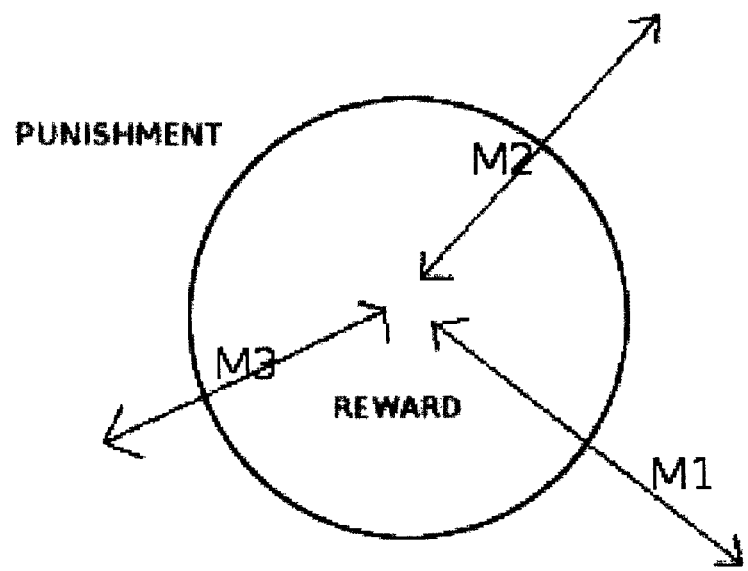
FIG. 4 is a graphic example of a potential matching methodology using multiple metrics.
Figure 6:
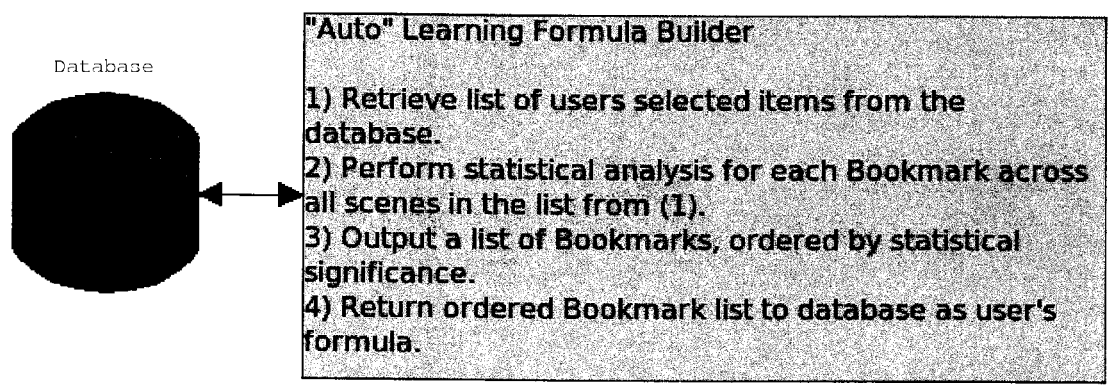
FIG. 6 is a graphic depiction of one contemplated embodiment for an automated learning formula builder that may be used with the present system and method.
Figure 7:
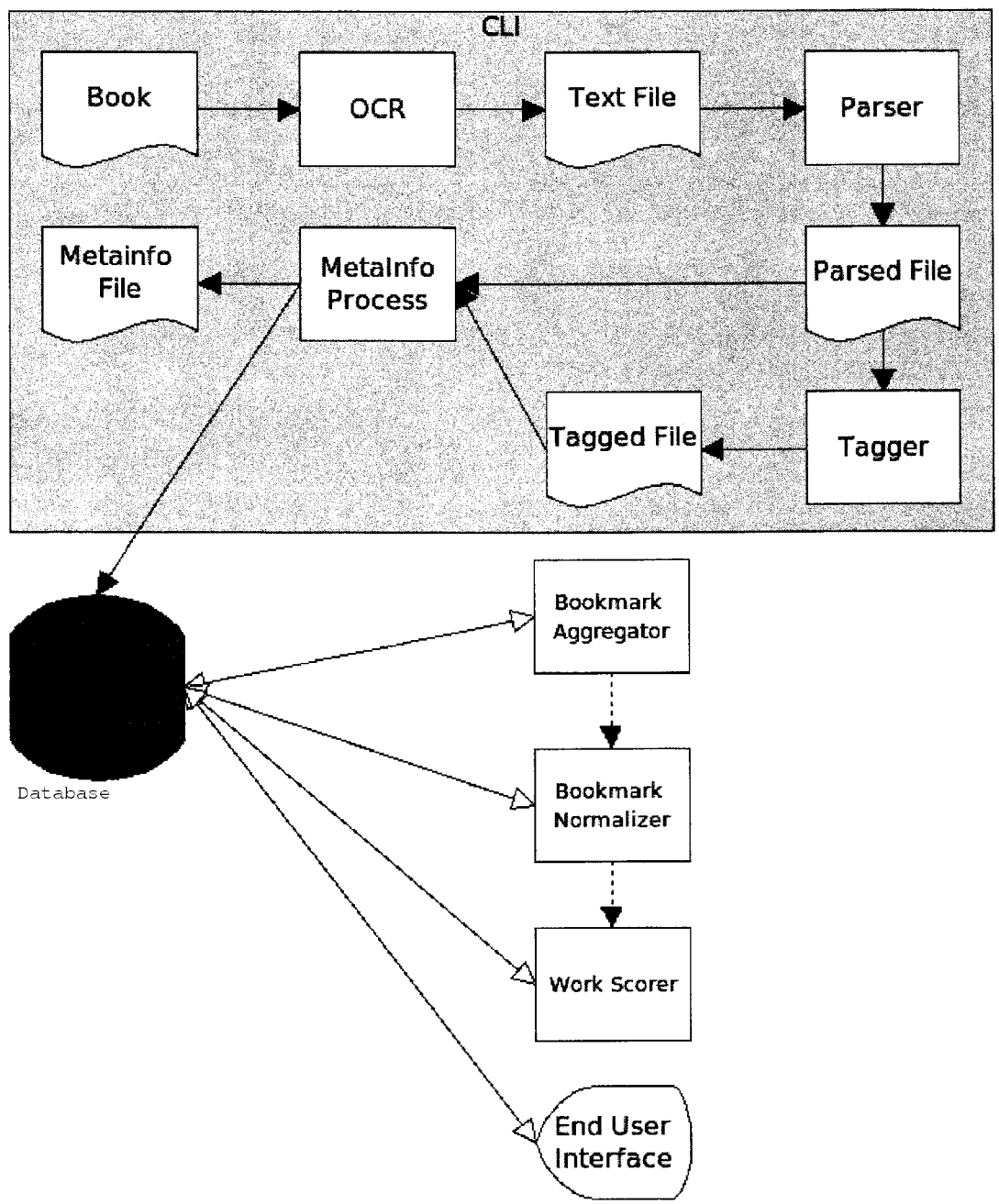
FIG. 7 is a block diagram depicting one contemplated embodiment of the present system and method.
Figure 8:
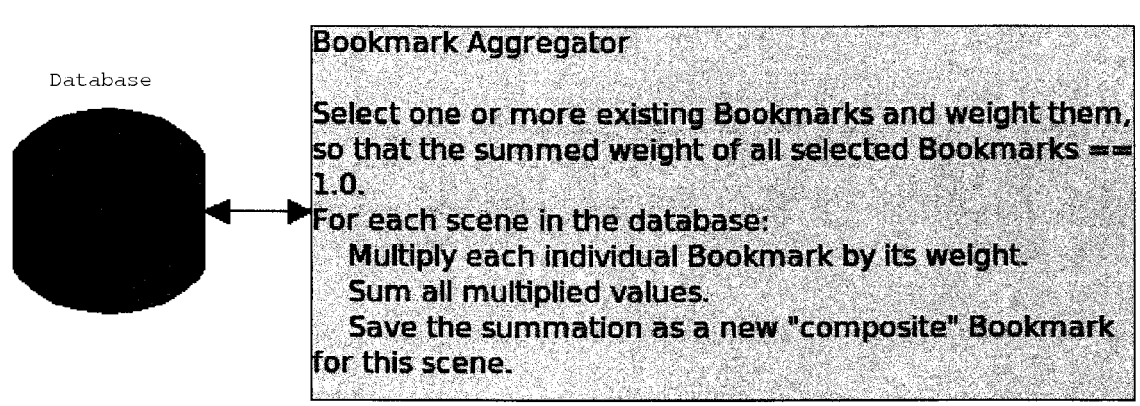
FIG. 8 is a graphic depiction of one contemplated embodiment for a bookmark aggregator that may be used with the present method and system.
Figure 9:
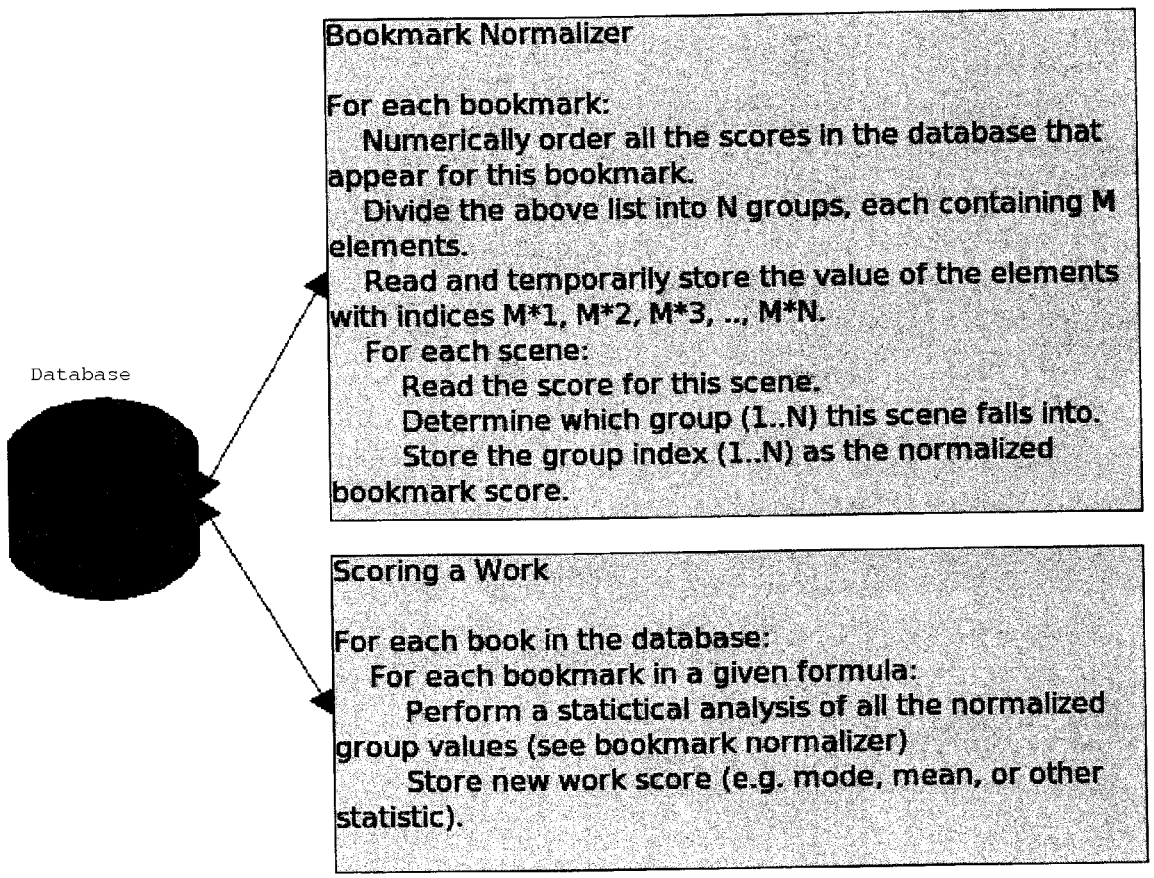
FIG. 9 is a graphic depiction of one contemplated embodiment for a bookmark normalizer and scoring methodology that may be used with the present system and method.

In one aspect, the Press My Limits feature may be used after the user creates at least one channel and populates the channel with texts. The system 10 may then identify the boundaries between reward and punishment for the individual user for all or a portion of the measured metrics. The system 10 may then attempt to identify texts based on the Press My Limits search criteria defined by the user (i.e. the user determines to what degree they want the book to fall outside of their identified preferences). The system 10 may return texts that have one or more metric values that fall close to or outside the user's reward vs. punishment boundary for each metric, meaning that at least one of the metric values is considered by the system to be punishment, or near to it. As the user increases the Press My Limits settings, the system 10 returns texts that have metric values that fall progressively farther outside the user's reward range, and are considered greater and greater punishments. This method can be applied to either a single metric (i.e. adjusting the base value of a single metric while leaving the others static), or to a combination of metrics. FIG. 4 depicts one graphic example of a potential Press My Limit setting using multiple metrics.

Where a combination of metrics is used the system 10 may be provided to judge which metrics are likely to be the most important for predicting which texts a user will or will not like. The system 10 uses the results of that analysis to determine which metrics and base values should be used in the Press My Limits search, and returns texts depending on where their values fall on a progressive scale of farther from or closer to a user's preferred values. In one embodiment, the system 10 may first gradually increase the base values of less important metrics, then increase the base values of more important metrics as the user increases the Press My Limits settings. In another embodiment, the system 10 may increase the base value of the more important metrics every time the metric immediately below it reaches the upper end of its range, such as shown in the chart depicted within FIG. 5. This figure depicts one example of how this system would operate if each bookmark were divided into 9 categories, ranked 1 through 9, and the bookmarks were arranged from left to right in order of decreasing significance. In the figure, each decimal place represents the value of one bookmark. The value of each bookmark is increased by one whenever the decimal place to the right of it reaches the top of its scale, similar to counting.

In one aspect, the system 10 has the ability to query users and receive feedback regarding the success of a given service. The system 10 may accept the user feedback for further processing, either to be incorporated into the system 10 in an effort to improve the functions of the system 10, for disposal, or for storage for later review. It is contemplated that user feedback can be solicited and given in a variety of forms, including but not limited to allowing users to rate the quality of a service, either in general, or in regards to a specific aspect of the system (such as asking the user to rate the success of a specific recommendation).

It is contemplated that users may have a preference for the level and type of emotional content in a text. Proximity of emotional identifiers also attempts to identify the general emotional content of a text, and identify the subject of that emotional focus. Specific objects or characters in a text may also introduce emotional content which triggers the user to have emotional attachment to the text. Accordingly, certain words may be tagged as emotional modifiers (e.g. "happy", "worried", "crying", . . . ) and the system 10 may use the parts-of-speech tagger to determine the target of these modifications, along with the frequency and distance of these modifiers to various target words. (Targets are most likely nouns or noun phrases). The system 10 may then modify the emotional score of each target, looking for targets which meet a minimum threshold of emotional modification, and tracking the number of these targets as well as statistical information about their scores.

In one aspect, the system 10 may be provided to perform Graph Profile Matching, wherein the system 10 compares texts based on the graphical representations of one or more Bookmark values across a text or series of texts for similar characteristics, such as matching rise and fall patterns of Bookmark values, frequency of shift points, and any other characteristic that can be identified and compared by the system. In pattern matching, the system 10 matches texts based on how the various Bookmark values change from scene to scene over the course of a text. For example, if one text starts with high density scenes, becomes less dense in the middle scenes, and highly dense again in the final scenes, the system 10 may match the text against other texts that share a similar pattern of starting with high density scenes, becoming less dense in the middle scenes, and returning to high density again in the final scenes. Patterns are considered to be similar if they share either quantitative characteristics (such as the values rise or fall to similar values) or qualitative characteristics (such as the values rise or fall to a similar degree).

The system 10 may further be provided to engage in adult content rating. By measuring the occurrences of certain words, phrases, or symbols, the system 10 can assign a text a "recommended age" metric. For example, the system 10 can identify individual swear words and assign a text a content metric value based on the quantitative or qualitative characteristics of the identified words or phrases inside the text.

In one aspect, the system 10 may be applied to many of uses. In one embodiment, the system 10 can be applied to any form of text, including but not limited to novels, articles, textbooks, and non-fiction books, to help match users to texts that match their specific criteria. For example, with respect to novels, the system 10 may be provided to find texts that a user is likely to enjoy. Regarding textbooks, the system 10 may be provided to help identify textbooks on a specific subject matter with the least technical or complex language. The sensitivity and methods of the system 10 may be adjusted to be the most applicable to the specific needs of what the system 10 is being asked to do. An example of this would be to adjust what the system 10 considers to be a scene or a scene break depending on whether the system 10 is being applied to a textbook with many subsections, or a novel with chapters.

In another aspect, the system 10 could be applied to analyzing the text of incoming e-mails to create a profile for the e-mails based on the metrics important to writing style. The system 10 could than compare these profiles to known spam and known e-mails that are not spam. The result of the analysis may then be used by the system 10 as an additional metric for identifying spam. This can be independent or used as a heuristic component of an external mail filtering system.

In another aspect, the system 10 may be applied to the content of websites to identify the likelihood that a specific website's content will be appealing to the preferences of a specific visitor in terms of writing style. If the data is available, the system 10 can analyze websites that a user has visited to create a profile of the user's stylistic preferences. It can do this by comparing the identified stylistic elements of the website content to metrics that are indicative of a user's interest in the site, such as the length of time that a user spends on a site, as well as the number and the type of links that the user clicks on. The system 10 may then attempt to identify which styles a user is likely to prefer based on these metrics, all other variables being equal. This can be combined with search systems based on content and key phrase matching to return not only results targeted to the user's search subject matter, but also to the user's individual stylistic preferences. Along with increasing the relevance of returned results, this approach would also make it very difficult for a website administrator to manipulate through content modification where a website shows up in the search results, since the determining formula would be partially based on the past behavior of each individual user. This information can also be analyzed to predict other content which the user is likely to enjoy. This information can also be utilized by other aspects of the system to improve other metrics, such as the user's Interest Level formulas.

In one aspect, the information gathered in the process above, under Website Analysis, can be used to determine the type and style of targeted advertising that is displayed. For example, a user may arrive at a page that has targeted advertising using this system. Before the user is shown the advertising, the system compares the stylistic interest profile of the user to the content of the website that is about to be displayed. If the user is visiting a site that is likely to hold the user's interest, the system uses this information to determine the advertising that is to be displayed. For example, advertising with the highest value can be displayed to users that are likely to remain the longest on any given site. Accordingly, if user A is likely to spend more time on Blog A then Blog B, based on an analysis of user A's past surfing behavior, the system will display content targeted advertising that has a greater rate of return per click than advertising that has a lower rate of return per click. A different user will have a different profile, so on a single site—depending on the user—the system can target the highest paying ads to the people most likely to spend the most time on the site.

In another aspect, the system 10 may be used to improve upon the current process for submitting a written manuscript for evaluation to a publisher or agent (Publisher's Project). The Publisher's Project is an alternative to the current methods of submitting manuscripts for publication. In one embodiment, a user (most likely a writer or agent) uploads a manuscript to the system. The system 10 analyzes the manuscript and creates a profile for matching against the database. The system 10 may then compare the profile of the manuscript with other profiles in the database and identify matching texts within genre that are already published. The system 10 may then identify which publishers or agents published or represented the matched texts. Optionally, the system 10 may be set to filter the results based on criteria set by the user, such as genre and whether or not a publisher or agent is currently accepting unsolicited manuscripts or proposals. The system 10 may be provided to return to the user a list of publishers or agents that have published or represented texts similar to the uploaded manuscript. This helps the user determine which publishers or agents they should submit their manuscript to, based on the historical patterns of the publisher or agent.

An alternative use of the Publisher's Project is to allow agents and publishers to identify and find unpublished texts that are included in the Publisher's Project database through either manual search via the system user interface, or a publisher notification process. In one embodiment of the publisher notification process, the user (most likely a Publisher or Agent) might create an account and identify texts that have similar characteristics to the types of texts that the user would like to represent or publish. The system could be provided to analyze the identified texts, and use that data to create a profile for matching similar texts. At that point, if a writer or prospective author uploads a manuscript to the Publisher's Project that matches the search profile created, the user (publisher or agent) is notified that a new match has occurred. Potentially, the user is given the option to view the content of the match online, depending on the permissions given by the manuscript uploader.

In another aspect, the system 10 may be used in a Writer's Project. The Writer's Project divides the database into books that are successful (for example, best sellers) and books that are not as successful (for example, not best sellers), and looks for statistically significant differences between the two categories, within genre. It attempts to identify the most successful stylistics trends for each genre, and then displays that information to users in a useful way. The Writer's Project may also allow a user to upload their manuscript for analysis by the system, and the results of the analysis are presented to the user. This feedback allows users to identify successful stylistic trends, and provides a tool that enables users to compare their own writing to those trends. It allows writers to review and tune their writing styles to match their texts to known successful writing styles by providing graphical and textual feedback of the writer's own texts (published or unpublished) compared to published texts.

In still another aspect, the system 10 may be used as an Alzheimer's detection system, using long-term trend analysis. The system 10 may be provided to track stylistic elements and use historical trends to identify shifts in long term or short term writing styles. This data can be analyzed for indicators of changes in health, stress levels, or attitude, and alert users. This may be used as a system for alerting the user of possible health indicators, such as a gradual decrease in vocabulary use over time possibly indicating the onset of dementia. This could be applied to any form of user created text, including outgoing e-mails or text documents, such as MS Word documents. The trends could indicate changes in the person's apparent cognitive abilities. In addition to specific health alert systems, this method could be applied across a large number of people to gather data about the health and stress levels across an entire organization. Psychology studies show that stress levels and other emotional factors impact many cognitive functions, such as creativity and word usage (i.e. people operating under time pressure may use shorter words when sending e-mails). Applied to an entire working environment, the system could be used to measure general shifts in writing style across an organization, and correlate these changes to established stress and health indicators. For example, an executive could use the results of an analysis showing a general rise and fall in the complexity of writing style averaged across the company to judge employee workload from one month to another.

In another aspect, the system 10 may be used to detect trends in writing styles and use trends in writing style across a series of books to match different book series with similar trends in writing style. Other elements such as content or genre may be used in this type of match as well. This implementation is very similar to the book analysis, but is tailored specifically for finding book series for readers rather than just individual book matches.

Applying the system 10 to video content is simply a matter of modifying the Input Format Converter to accept video content and subtitles for conversion. Instead of parsing just text data for stylistic elements, the system parses the video content for stylistic elements, and stores information about that data for analysis by the system. An example of this would be using software to automatically identify changes in camera angles and cuts in the film. These breaks can be one definition of a scene. Specific stylistic elements could be identified in other ways. For example, explosions may be able to be identified by measuring the percentage of pixels in a video content that is of a certain color range, such as orange or yellow to correspond to the coloration of an explosion. This visual information can be combined with auditory cues (such as a high gain audio cue that matches previously identified "explosion" patterns) and textual cues (such as the word "Boom!" in the subtitle content), to identify the occurrence of an explosion within the video content. The frequency of scene cuts, fast vs. slow video movement, steady (i.e. a slow pan) vs. bouncing video style (i.e. similar to Saving Private Ryan), rate of explosions and love scenes, among as well as other metrics, could all be considered stylistic elements that could potentially be used for analysis. This data can then be used to predict user preferences for other movies.

In one aspect, the system 10 may be used as a plagiarism detector. Specifically, the system 10 may be provided to analyze and compare the metrics of one text to another. Depending on the needs of the user, the system 10 may be provided to identify and flag possible occurrences of plagiarism against texts contained in the database. Notices may be provided by the system 10 to the user when one or more texts are flagged to enable further investigation by the user.

In one aspect, the system 10 may be used as a tool for judging general opinion about a subject on the Internet. Applied to blog and website content, the system 10 could be adapted to use the method described for emotional identifiers to identify emotional content and the subject matter of that emotional content within a blog or website. Used as an Internet spider, the system 10 may be provided to gather data from blogs that discuss a certain subject matter, and identify whether the discussion is generally positive or negative regarding that subject.

In another aspect, the system 10 may provided as a stand alone application that encompasses all steps from initial input formatting to metainfo extraction, with the exception that the results would not be transmitted directly to the database. Rather, the information would be transmitted to a remote system for further processing and eventual input into the database. This element is useful for allowing individual users to contribute content without requiring them to ever transmit copyrighted material. For example, a user could download the application, scan a text, and have the application perform all the steps between initial input formatting and metainfo processing locally on the user's system. After the needed data and metrics have been stored, the original text could be deleted from the user's system, and only the extracted data, such as the number of scenes and the data about those scenes, could be stored and transmitted to a centralized the system for processing into the database.

Although the above embodiments have been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims herein appended.

What is claimed is:

1. A method of analyzing text, the method comprising: providing a system capable of electronically receiving and manipulating text data associated with the text; providing a database that is comprised of data relative to one or more reference texts; said system being enabled to electronically access said database; using said system to recognize the text data as one or more scenes and a plurality of boundaries; using said system to analyze said one or more scenes and identify one or more elements of the text within said one or more scenes; and compiling the identified one or more elements of text within said one or more scenes to provide a bookmark that is a measured representation of the text, wherein said bookmark is a perspective bookmark complied by counting a number of first person indicators within dialog containing sentences within said one or more scenes.

2. The method of claim 1 further comprising: comparing said measured representation of the text with said data relative to one or more reference texts to identify similarities between the text and said one or more reference texts.

3. The method of claim 2 further comprising: ranking differences between the text and said one or more reference texts on a spectrum.

4. The method of claim 1 wherein the text is a printed text, the method further comprising: scanning the text into a text data format that is readable by a computer device.

5. The method of claim 1 wherein said boundaries are comprised of natural boundaries.

6. The method of claim 1 wherein said boundaries are comprised of predetermined length boundaries.

7. The method of claim 1 wherein said one or more elements of text include at least one of: the subtypes of verbs, total number of verbs, total number of adjectives, total number of adverbs, total number of nouns, types of punctuation, total number of prepositions, total number of conjunctions, total number of interjections, total number of modifiers, total number of predeterminers, total number of pronouns, total number of particles, total number of symbols, paragraph length, a number of paragraphs, amount of content within dialog, amount of content outside of dialog, word length, total text length, sentence length, ratio of commas to sentence length, total number of unique words, type of vocabulary, total number of non-English words and total number of words containing unusual characters.

8. The method of claim 7 wherein said bookmark is a comparison of two or more of the elements identified within claim 7.

9. The method of claim 1 wherein said bookmark is a pacing bookmark compiled by the detection and analysis of pacing factors within said one or more scenes.

10. The method of claim 9 wherein said pacing factors comprise analysis of paragraph length and amount of dialog exchange between multiple characters.

11. The method of claim 9 wherein said pacing factors further comprise analysis of sentence length, scene length and punctuation.

12. The method of claim 1 wherein said bookmark is a density bookmark compiled by an analysis of said one or more scenes for at least one of: word length, vocabulary, sentence length, and amount of punctuation.

13. The method of claim 1 wherein said bookmark is a dialog bookmark compiled by quantifying an amount of dialog within said one or more scenes spoken by a character.

14. The method of claim 1 wherein said bookmark is a description bookmark compiled by a quantification and analysis of adjectives and adverbs within said one or more scenes.

15. The method of claim 1 wherein said bookmark is an action bookmark compiled by analyzing a ratio of verbs to total word count within said one or more scenes.

16. The method of claim 1 wherein said bookmark is a rating bookmark compiled by an analysis of user feedback, relative to user opinion of one or more reference texts, received by said system.

17. The method of claim 16 wherein said user feedback is comprised of data received directly from a user, by the user providing responsive feedback.

18. The method of claim 16 wherein said user feedback is comprised of data generated by said system though said system analyzing data generated by a user during user interaction with said system.

19. The method of claim 1 wherein said bookmark is a cumulative bookmark that is representative of a plurality of scenes within the text.

20. The method of claim 1 wherein said system compiles the identified one or more elements of text within said one or more scenes to provide a plurality of bookmarks that are different from one another as measured representations of the text.

21. The method of claim 20 further comprising: providing the system with a user-defined hierarchal ranking of said plurality of bookmarks; and comparing said plurality of bookmarks, according to said user-defined hierarchal ranking, with said data relative to one or more reference texts to identify similarities or differences between the text and said one or more reference texts.

22. The method of claim 21 further comprising: providing the system with bookmark data from a user-created or user-selected source; and comparing said bookmark data from the user-created or user-selected source with said data relative to one or more reference texts to identify one or more of said reference texts with an intersection of bookmark data, irrespective of a hierarchal order of said bookmark data.

23. The method of claim 1 further comprising: creating a user account on said system; said user account comprising information relative to one or more user preferences; and comparing said user preferences with said data relative to one or more reference texts to identify one or more reference texts that embody one or more of said user preferences.

24. The method of claim 23 further comprising; collecting information relative to one or more user preferences during a plurality of separate periods, spaced apart from one another over time.

25. The method of claim 1 wherein said bookmark is personalized to a user's preferences by: providing the text data as data relative to a plurality of user selected reference texts; using said system to identify one or more elements within each of the user selected reference texts; using the system to compare said plurality of user selected reference texts by identifying variations in said one or more elements among said plurality of user selected reference texts; and providing cumulative scores for said one or more elements of text to provide a personalized bookmark.

26. The method of claim 25 further comprising: calculating a standard deviation for the cumulative scores for said one or more elements of text within said personalized bookmark; and ordering the cumulative scores for said one or more elements of text within said personalized bookmark according to a size of the calculated standard deviations.

27. A method of analyzing text, the method comprising: providing a system capable of electronically receiving and manipulating text data associated with the text; providing a database that is comprised of data relative to one or more reference texts; said system being enabled to electronically access said database; using said system to recognize the text data as one or more scenes and a plurality of boundaries; using said system to analyze said one or more scenes and identify one or more elements of the text within said one or more scenes; and compiling the identified one or more elements of text within said one or more scenes to provide a bookmark that is a measured representation of the text, wherein said bookmark is a dialog bookmark compiled by quantifying an amount of dialog within said one or more scenes spoken by a character.

28. A method of analyzing text, the method comprising: providing a system capable of electronically receiving and manipulating text data associated with the text; providing a database that is comprised of data relative to one or more reference texts; said system being enabled to electronically access said database; using said system to recognize the text data as one or more scenes and a plurality of boundaries; using said system to analyze said one or more scenes and identify one or more elements of the text within said one or more scenes; and compiling the identified one or more elements of text within said one or more scenes to provide a bookmark that is a measured representation of the text, wherein said bookmark is an action bookmark compiled by analyzing a ratio of verbs to total word count within said one or more scenes.

29. A method of analyzing text, the method comprising: providing a system capable of electronically receiving and manipulating text data associated with the text; providing a database that is comprised of data relative to one or more reference texts; said system being enabled to electronically access said database; using said system to recognize the text data as one or more scenes and a plurality of boundaries; using said system to analyze said one or more scenes and identify one or more elements of the text within said one or more scenes; and compiling the identified one or more elements of text within said one or more scenes to provide a bookmark that is a measured representation of the text, wherein said bookmark is a rating bookmark compiled by an analysis of user feedback, relative to user opinion of one or more reference texts, received by said system.

30. A method of analyzing text, the method comprising: providing a system capable of electronically receiving and manipulating text data associated with the text; providing a database that is comprised of data relative to one or more reference texts; said system being enabled to electronically access said database; using said system to recognize the text data as one or more scenes and a plurality of boundaries; using said system to analyze said one or more scenes and identify one or more elements of the text within said one or more scenes; compiling the identified one or more elements of text within said one or more scenes to provide a plurality of bookmarks that are different from one another as measured representations of the text; and providing the system with a user-defined hierarchal ranking of said plurality of bookmarks; and comparing said plurality of bookmarks, according to said user-defined hierarchal ranking, with said data relative to one or more reference texts to identify similarities or differences between the text and said one or more reference texts.

31. A method of analyzing text, the method comprising: providing a system capable of electronically receiving and manipulating text data associated with the text; providing a database that is comprised of data relative to one or more reference texts; said system being enabled to electronically access said database; using said system to recognize the text data as one or more scenes and a plurality of boundaries; using said system to analyze said one or more scenes and identify one or more elements of the text within said one or more scenes; compiling the identified one or more elements of text within said one or more scenes to provide a bookmark that is a measured representation of the text, wherein said system compiles the identified one or more elements of text within said one or more scenes to provide a plurality of bookmarks that are different from one another as measured representations of the text; providing the system with bookmark data from a user-created or user-selected source; and comparing said bookmark data from the user-created or user-selected source with said data relative to one or more reference texts to identify one or more of said reference texts with an intersection of bookmark data, irrespective of a hierarchal order of said bookmark data.

32. A method of analyzing text, the method comprising: providing a system capable of electronically receiving and manipulating text data associated with the text; providing a database that is comprised of data relative to one or more reference texts; said system being enabled to electronically access said database; using said system to recognize the text data as one or more scenes and a plurality of boundaries; using said system to analyze said one or more scenes and identify one or more elements of the text within said one or more scenes; and compiling the identified one or more elements of text within said one or more scenes to provide a bookmark that is a measured representation of the text, wherein said bookmark is personalized to a user's preferences by: providing the text data as data relative to a plurality of user selected reference texts; using said system to identify one or more elements within each of the user selected reference texts; using the system to compare said plurality of user selected reference texts by identifying variations in said one or more elements among said plurality of user selected reference texts; and providing cumulative scores for said one or more elements of text to provide a personalized bookmark.

\* \* \* \* \*